May 3, 1927.
V. R. GOELLER
TIRE SPREADER
Filed Jan. 19 1927
1,627,500
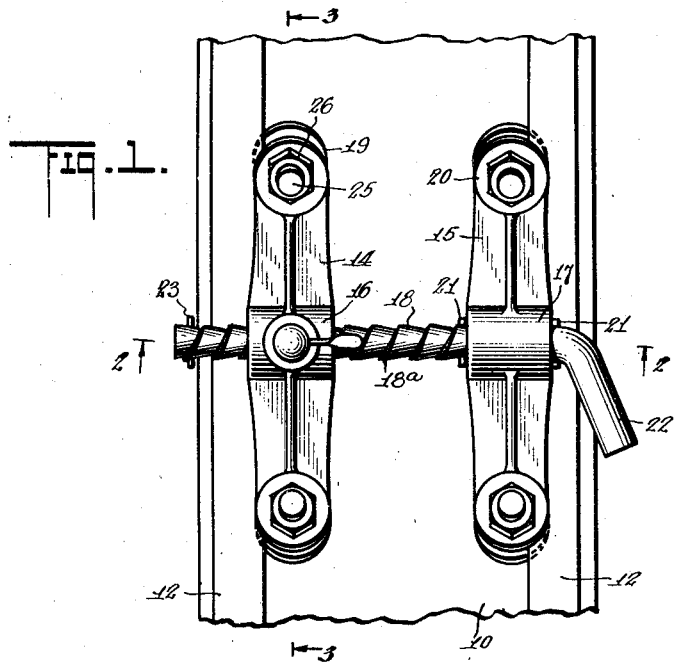
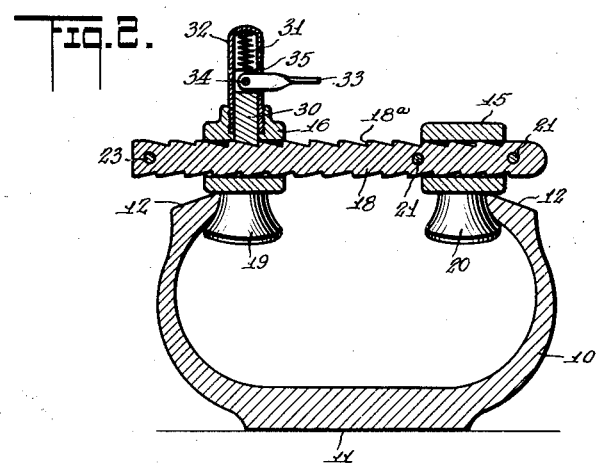
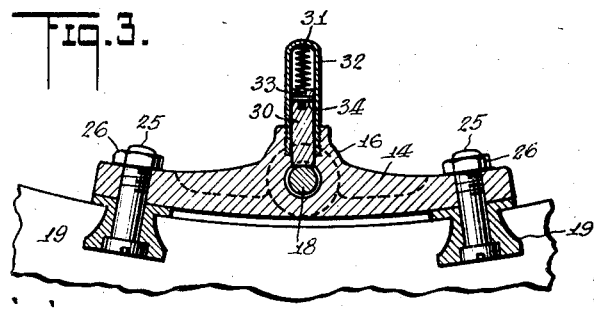
INVENTOR
Vernon R. Goeller
BY Munn & Co.
ATTORNEY
WITNESSES Patented May 3, 1927.

1,627,500

UNITED STATES PATENT OFFICE.

VERNON R. GOELLER, OF BOONTON, NEW JERSEY.

TIRE SPREADER.

Application filed January 19, 1927. Serial No. 162,110.

The present invention is concerned with the provision of a tool intended for spreading open an automobile tire, either for purposes of repair, or to permit inspection of the inside of the shoe. An object of the invention is to provide a tool of this nature so constructed, that it may be conveniently used in connection with all sizes of tires, and which serves not only to spread the tire at one point, but is capable of being shifted around the tire to progressively open up the latter throughout its entire length so that the entire tire may be inspected without removing the tool from its operative position therein.

Another object of the invention is to provide a spreader in which a series of rollers are used to retain the flanges in properly spaced position; the rollers being so constructed that they afford traction means for shifting the spreading tool around the inside of the tire.

A further object of the invention is to provide a novel mechanism which will permit the ready collapse of the spreading means and its removal from the shoe after it has served its purpose.

The present invention is designed primarily as an improvement over the tire spreader disclosed in my copending application Serial No. 148,046 filed November 12, 1926. The device disclosed in the above application has proven entirely suitable for handling balloon tires and other tires which have comparatively flexible beads. It has been found however, that the tool cannot be conveniently used for handling truck tires or bus tires with stiff beads, inasmuch as it is very difficult to spread the beads apart by direct manual pull on the tool. The device of the present invention therefore, aims to overcome the difficulty above noted, and to use a screw feed to effect the spreading, and a novel mechanism for releasing the screw feed to permit collapse; it being understood that the present device is primarily intended for use on relatively heavy stiff beaded tires.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Fig. 1 is a fragmentary plan view of the inside of a tire showing a tool in applied position to spread the tire casing open.

Fig. 2 is a transverse sectional view on the line 2—2 of Fig. 1.

Fig. 3 is a longitudinal sectional view on the line 3—3 of Fig. 1.

In the drawings I have used the reference character 10 to designate a tire shoe which may be of conventional construction including the usual tread portion 11 and beads 12 adapted to be spread apart for the insertion of an inner tube or for the purpose of permitting inspection or repair of the shoe 10. The spreader includes a pair of parallel arm portions 14 and 15 formed with central bearings 16, and 17 mounted for relative movement to effect advance or separation of the arms along a transversely disposed shank 18. This shank instead of being simply notched as in my prior application, is formed with a relatively coarse buttress thread 18$^a$.

The ends of the arm 14 carry rollers 19 adapted to engage one bead of the tire, and the free ends of the arm 15 carry rollers 20 engageable with the opposite bead as the two arms are separated along the shank 18. Preferably the arm 15 is stationary relative to the shank 18, being confined between a pair of stop pins 21 passed through the shank. An offset end 22 of the shank preferably constitutes a handle for rotating the shank and effecting spreading movement of the arms 14, 15 as will be later described. Movement of the arm 14 along the shank is limited by one of the pins 21 and a pin 23 adjacent the shank end.

The rollers 19 and 20 are preferably shaped to interlock with the inner faces of the tire beads 12, these rollers being of general concave conical formation at their exterior surfaces, and being journalled on screws or bolts 25 retained in position by nuts 26. A pawl or dog 30 working through the bearing 16 is urged into engagement with the shank 18 by a coiled expansion spring 31 backed against the inner end of a tubular housing 32 which guides the movement of the pawl. The pawl may be lifted out of engagement with the threads of the shank by operating a finger lever 33 pivotally connected at 34 to the end of the pawl, and fulcruming on the lower edge of a slot 35 in the housing 32.

The operation of the device is substantially as follows. The two tire beads are slightly spread apart to permit the insertion of the tool, with the opposite pairs of rollers resting against the inner faces of the tire beads. The handle 22 is then turned, effecting relative separation of the arms 14 and 15 due to the engagement of the buttress thread 18$^a$ and the pawl 30. The pawl effectively prevents relative advance of the arms toward each other under the pressure exerted by the resilient shoe. With the parts in this position, the intermediate portion of the shank may be used as a handle, and the tool rolled around the tire to successively open and expose the entire interior thereof for purposes of inspection or repair. When it is desired to remove the spreading tool, it is simply necessary to depress the lever 33, lifting the pawl 30 out of engagement with the buttress thread 18$^a$ and permitting the shoe to spring back to its normal shape, moving the two arms 14 and 15 together, in which position they may be readily disengaged from the shoe.

It is to be noted that the shape of the rollers 19 and 20 is such that there is no danger of the tool jumping out of the tire or becoming disengaged therefrom as it is rolled around to successively expand different portions of the tire. The use of the buttress thread and the lever-operated pawl permits heavy stiff beaded tires to be handled with expedition and facility, since the screw action and lever permit extremely easy manipulation of the spreader.

Obviously, numerous changes and alterations might be made in the general form and arrangement of the parts described without departing from the invention. Hence I do not wish to limit myself to the details set forth, but shall consider myself at liberty to make such changes and alterations as fairly fall within the spirit and scope of the appended claims.

I claim:

1. A tire spreading tool including a shank formed with a buttress thread, a pair of parallel arms including hubs through which the shank extends, both arms being free for rotary movement relatively to the shank and one of said arms being free for sliding movement on the shank, tire bead engaging rollers carried by the ends of the arms, a spring pressed dog working through the hub of the slidable arm and engaged with the buttress thread, whereby when the arms are engaged with opposite beads of a tire, rotation of the shank will effect separation of the arms to spread the tire.

2. A tire spreading tool including a shank formed with a buttress thread, a pair of parallel arms including hubs through which the shank extends, both arms being free for rotary movement relatively to the shank and one of said arms being free for sliding movement on the shank, tire bead engaging rollers carried by the ends of the arms, a spring pressed dog working through the hub of the slidable arm and engaged with the buttress thread, whereby when the arms are engaged with opposite beads of a tire, rotation of the shank will effect separation of the arms to spread the tire, and a lever for retracting the dog.

3. A tire spreading tool including a shank formed with a buttress thread, a pair of parallel arms including hubs through which the shank extends, both arms being free for rotary movement relatively to the shank and one of said arms being free for sliding movement on the shank, tire bead engaging rollers carried by the ends of the arms, a spring pressed dog working through the hub of the slidable arm and engaged with the buttress thread, whereby when the arms are engaged with opposite beads of a tire, rotation of the shank will effect separation of the arms to spread the tire, and a handle for rotating the shank.

VERNON R. GOELLER.